(12) United States Patent
Kim et al.

(10) Patent No.: US 8,786,714 B2
(45) Date of Patent: Jul. 22, 2014

(54) ZOOM LENS AND IMAGING APPARATUS INCLUDING THE SAME

(71) Applicant: Samsung Electronics Co., Ltd., Suwon-si (KR)

(72) Inventors: Jin-woo Kim, Suwon-si (KR); Dong-ok Choi, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 26 days.

(21) Appl. No.: 13/711,936

(22) Filed: Dec. 12, 2012

(65) Prior Publication Data

US 2014/0022436 A1   Jan. 23, 2014

(30) Foreign Application Priority Data

Jul. 23, 2012 (KR) ........................ 10-2012-0080252

(51) Int. Cl.
*H04N 5/228* (2006.01)
*H04N 5/232* (2006.01)

(52) U.S. Cl.
USPC ................. 348/208.11; 348/345; 348/240.99; 396/315; 359/319; 359/684

(58) Field of Classification Search
USPC ................. 348/208.11, 211.9, 240.99, 240.1, 348/240.2, 240.3, 224.1, 291, 326, 345
See application file for complete search history.

(56) References Cited

U.S. PATENT DOCUMENTS

| | | | | |
|---|---|---|---|---|
| 5,633,757 A * | 5/1997 | Park | .............................. | 359/650 |
| 7,057,831 B2 * | 6/2006 | Ogawa | .......................... | 359/795 |
| 7,193,789 B2 * | 3/2007 | Maetaki | ........................ | 359/687 |
| 7,626,771 B2 * | 12/2009 | Yokoyama | ..................... | 359/754 |
| 7,643,228 B2 * | 1/2010 | Ishibashi | ....................... | 359/793 |
| 8,233,223 B2 * | 7/2012 | Lee | ................................. | 359/748 |
| 2009/0168179 A1 * | 7/2009 | Toyoda | ......................... | 359/557 |
| 2010/0079733 A1 * | 4/2010 | Lu | .................................... | 353/69 |
| 2010/0231781 A1 * | 9/2010 | Lee | ................................. | 348/345 |
| 2011/0157429 A1 | 6/2011 | Matsunaga et al. | | |
| 2011/0261469 A1 | 10/2011 | Arai | | |
| 2012/0019925 A1 | 1/2012 | Kurioka et al. | | |

FOREIGN PATENT DOCUMENTS

| | | |
|---|---|---|
| JP | 2011-133799 A1 | 7/2011 |
| JP | 2011-232503 A1 | 11/2011 |
| JP | 2012-042927 A1 | 3/2012 |

OTHER PUBLICATIONS

Search Report established for EP 13156940.2 (Oct. 22, 2013).

* cited by examiner

*Primary Examiner* — Hung Lam
(74) *Attorney, Agent, or Firm* — Drinker Biddle & Reath LLP

(57) ABSTRACT

A zoom lens includes a first lens group having a positive refractive power; a second lens group having a negative refractive power; a third lens group including a first sub-lens group having a positive refractive power, an iris, and a second sub-lens group having a positive refractive power; and a fourth lens group having a positive refractive power, wherein the first to fourth lens groups are sequentially arranged from an object side to an image side, the distance between each of the first through fourth lens groups changes when zooming, the surface of the lens closest to the image side in the first sub-lens group is concave, the lens closest to the object side in the second sub-lens group is a meniscus lens concave towards the object side, and the lens located closest to the object side in the third lens group is an aspheric lens.

14 Claims, 12 Drawing Sheets

FIG. 2A
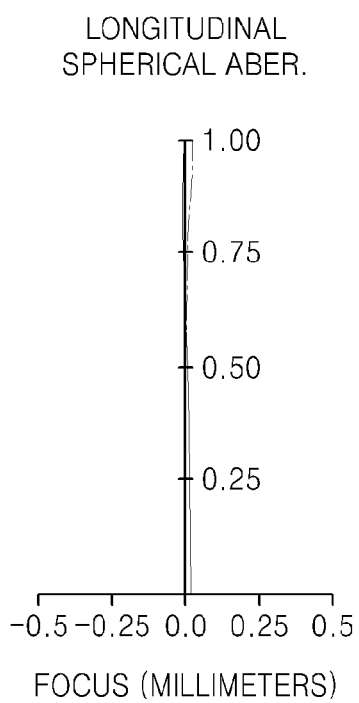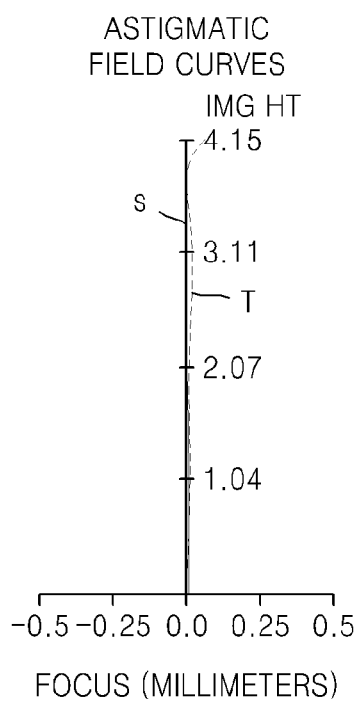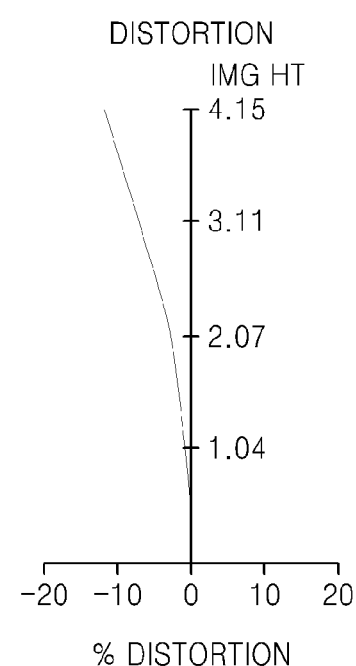

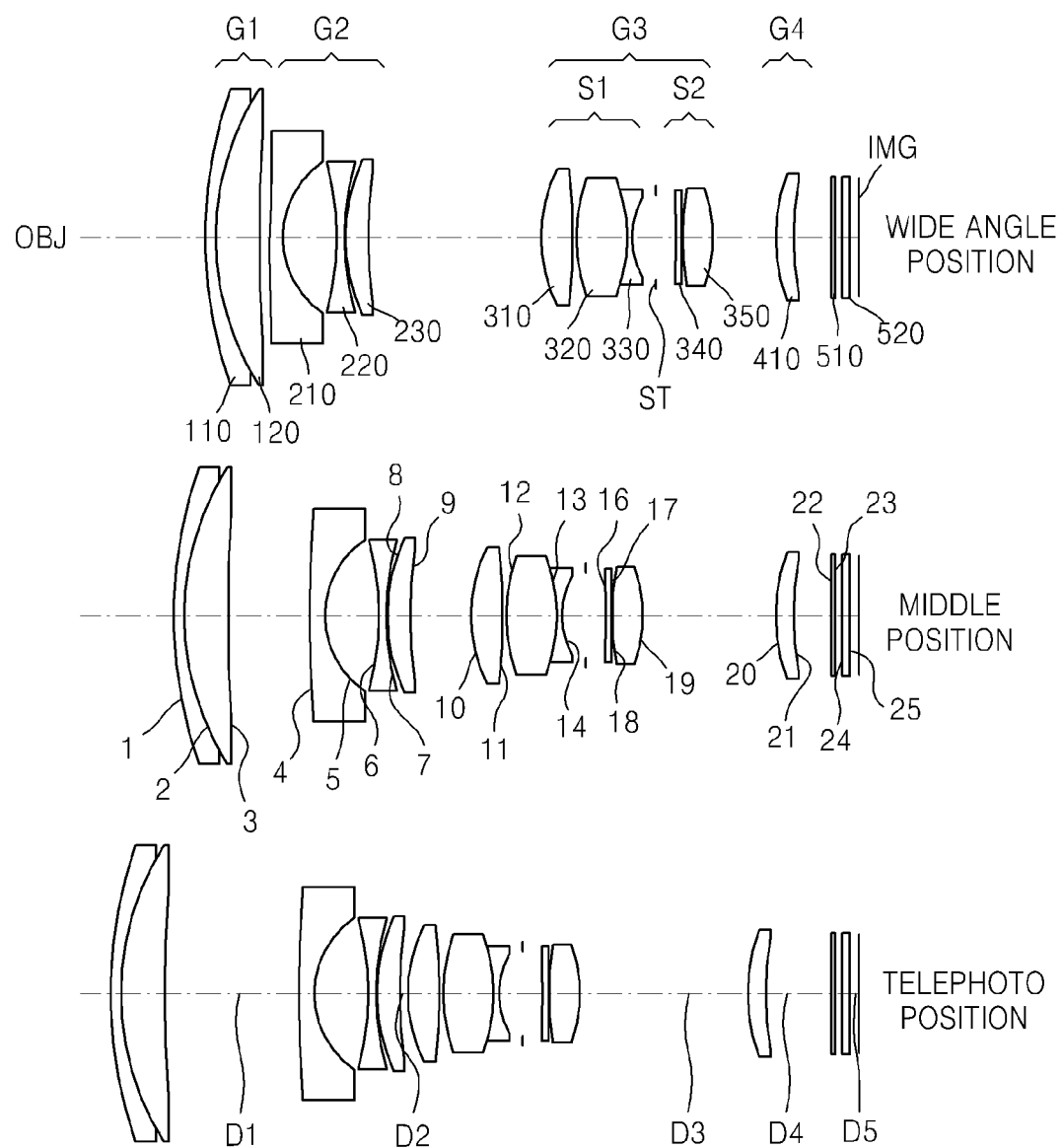

ZOOM LENS AND IMAGING APPARATUS INCLUDING THE SAME

CROSS-REFERENCE TO RELATED PATENT APPLICATION

This application claims the benefit of Korean Patent Application No. 10-2012-080252, filed on Jul. 23, 2012, in the Korean Intellectual Property Office, the disclosure of which is incorporated herein in its entirety by reference.

BACKGROUND

Embodiments relate to a zoom lens and an imaging apparatus that are used for subminiature cameras, digital video cameras, mobile phones, Personal Digital Assistants (PDAs), and the like.

As the development and use of optical imaging devices, such as digital cameras and digital camcorders using a solid-state image pickup device such as a charge coupled device (CCD) or complementary metal-oxide semiconductor (CMOS), have increased considerably, a zoom lens having high performance and a miniaturized and light-weight structure is in demand.

With regard to optical systems including a solid-state image pickup device, market demand is increasing for a wide angle and high resolution lens, and accordingly, a bright lens having a small F-number and a wide angle has been proposed. In addition, a high-performance optical system capable of hand shake correction has been proposed to be used together with a bright lens having a small F-number.

In many cases, optical systems have only one of a wide angle function and a high magnification function, and a bright lens having a small F-number for fixed-focus optical systems. The bright lens having a small F-number has a large size and is heavy and expensive due to its complicated optical structure. In addition, with hand shake correction included in a bright lens having a small F-number also has a large size and is heavy, and accordingly, a control device and a mechanical device used in such a hand shake correction optical system also has a large size.

For example, a wide-angle and bright zoom lens typically consists of five lens groups, and since each lens group individually moves during zooming, the mechanical structure of the wide-angle and bright zoom lens is complicated and it is also large.

In another example, a zoom lens may consist of four lens groups having positive, negative, positive, and positive refractive powers, respectively, and in this case, although an F-number of about 1.8 is realized, the size of a third lens group should be large to realize a slightly brighter large aperture. Accordingly, a control device and a mechanical device for hand shake correction are also large, and thus, the entire lens barrel of the zoom lens must be large as well. In addition, due to the large aperture, it is difficult to control the chromatic aberration of the zoom lens.

SUMMARY

Embodiments provide a zoom lens that has excellent optical performance, a wide angle, and a large aperture, and is bright.

According to an embodiment, there is provided a zoom lens including: a first lens group having a positive refractive power; a second lens group having a negative refractive power; a third lens group including a first sub-lens group having a positive refractive power, an iris, and a second sub-lens group having a positive refractive power; and a fourth lens group having a positive refractive power, wherein the first to fourth lens groups are sequentially arranged from an object side to an image side, each distance between lens groups of the first lens group to the fourth lens group changes when zooming from a wide angle position to a telephoto position, the surface of a lens located closest to the image side in the first sub-lens group is concave, the lens closest to the object side in the second sub-lens group is a meniscus lens concave towards the object side, and the lens closest to the object side in the third lens group is an aspheric lens that satisfies the conditions:

$Vd2 \geq 60$ $Vd3 \geq 70$, where $Vd2$ denotes an Abbe number of the negative lens included in the second lens group, and $Vd3$ denotes an Abbe number of a lens included in the third lens group.

The second lens group may be configured to move for hand shake correction.

The zoom lens may also satisfy the condition:

$2.0 \leq f\_S2/fw \leq 4.1$, where $f\_S2$ denotes the focal length of the second sub-lens group, and fw denotes the focal length at a wide angle position of the overall zoom lens.

The zoom lens may also satisfy the condition:

$4 \leq f4/fw \leq 8.5$, where f4 denotes the focal length of the fourth lens group, and fw denotes the focal length at a wide angle position of the overall zoom lens.

The fourth lens group may include a lens made of a plastic resin material.

The first lens group may include a positive lens and a negative lens.

The zoom lens may also satisfy the condition:

$Pvd - Nvd \geq 10$, where Pvd denotes an Abbe number of the positive lens included in the first lens group, and Nvd denotes an Abbe number of the negative lens included in the first lens group.

The first lens group may include a doublet lens containing a positive lens and a negative lens that are combined with each other.

The zoom lens may satisfy the condition:

$Nd1 \geq 1.9$, where Nd1 denotes a refractive index of lenses included in the first lens group.

The second lens group may include an aspheric lens having a negative refractive power.

The third lens group may include an aspheric lens having a positive refractive power.

The fourth lens group may include an aspheric lens having a positive refractive power.

The fourth lens group may include a meniscus-shaped lens convex towards an object side.

According to another embodiment, there is provided an imaging apparatus including: a zoom lens; and an image pickup device for converting an optical image formed by the zoom lens into an electrical signal.

BRIEF DESCRIPTION OF THE DRAWINGS

The above and other features and advantages will become more apparent from the detailed description of exemplary embodiments with reference to the attached drawings in which:

FIGS. 2A and 2B illustrate longitudinal spherical aberrations, astigmatic field curves, and distortions at the wide angle position and the telephoto position of the zoom lens according to the embodiment illustrated in FIG. 1;

FIG. 5 illustrates an arrangement at a wide angle position, a middle position, and a telephoto position of a zoom lens according to a third embodiment;

DETAILED DESCRIPTION

Figure 1:
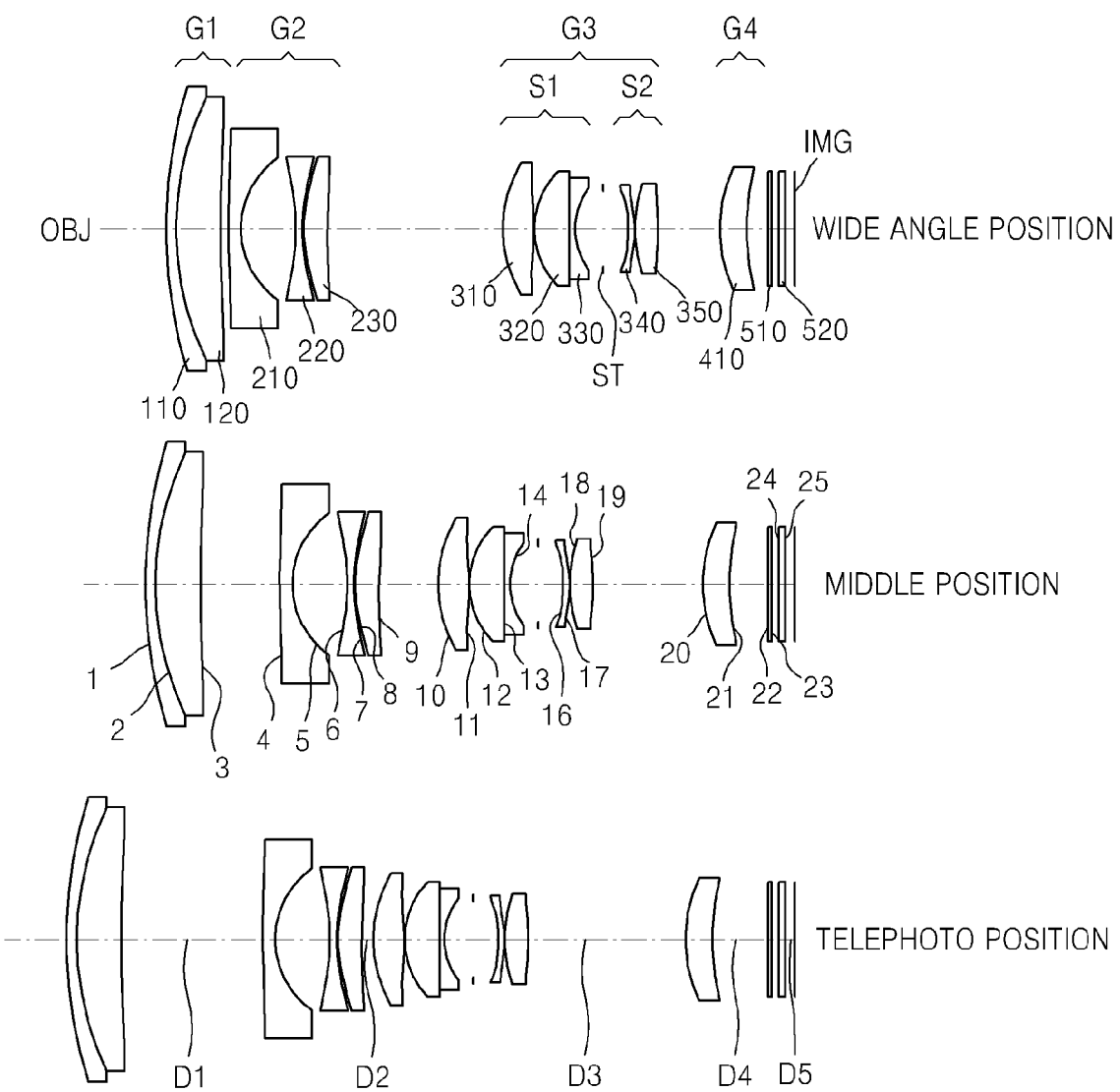
FIG. 1 illustrates an arrangement at a wide angle position, a middle position, and a telephoto position of a zoom lens according to a first embodiment.

Embodiments will now be described more fully with reference to the accompanying drawings. In the drawings, like reference numerals denote like elements, and the sizes and thicknesses of components may be exaggerated for clarity of description.

FIGS. 1, 3, 5, and 7 show optical arrangements of zoom lenses according to first to fourth embodiments, respectively.

Each of the zoom lenses according to the first to fourth embodiments forms an optical system including four lens groups G1, G2, G3, and G4 sequentially having positive, negative, positive, and positive refractive powers from an object side OBJ. The zoom lenses according to the first to fourth embodiments may respectively have a wide angle and a large aperture, and a structure allowing a minimum change in an F-number when zooming from a wide angle position to a telephoto position.

Each of the zoom lenses according to the first to fourth embodiments includes sequentially from the object side OBJ to an image side IMG, a first lens group G1 having a positive refractive power, a second lens group G2 having a negative refractive power, a third lens group G3 having a positive refractive power, and a fourth lens group G4 having a positive refractive power. When zooming from the wide angle position to the telephoto position, the first to fourth lens groups G1, G2, G3, and G4 respectively move so that the distance between every two lens groups changes, and the fourth lens group G4 functions to move an image field and correct a focal position.

Each of the zoom lenses according to the first to fourth embodiments has an iris ST in the third lens group G3 having a positive refractive power in order to realize a bright lens with a large aperture. Thus, the iris diameter may be small, thereby causing an increase in a shutter speed. When the iris ST is located in front of the third lens group G3, the iris diameter is large in a maximum iris state, and thus, it is difficult to maintain a high shutter speed.

In addition, the third lens group G3 is formed by a first sub-lens group 51, which is on the object side OBJ with respect to the iris ST and has a positive refractive power, and a second sub-lens group S2, which is on the image side IMG with respect to the iris ST and has a positive refractive power. The surface of the lens closest to the image side IMG from among the first sub-lens group 51 is concave towards the image side IMG, and a lens located closest to the object side OBJ from among the second sub-lens group S2 is a meniscus lens concave towards the object side OBJ. Accordingly, a symmetrical structure having a Gaussian shape with respect to the iris ST is formed, thereby being easy to control an aberration. In addition, a lens closest to the object side OBJ from among the third lens group G3 is an aspheric lens, and thus, it is possible to control a spherical aberration caused by a large diameter lens.

In addition, each of the zoom lenses according to the first to fourth embodiments may satisfy the condition:

$$Vd2 \geq 60 \quad (1)$$

where $Vd2$ denotes an Abbe number of lenses having a negative refractive power in the second lens group G2.

To satisfy the above condition, a low dispersion material is used for lenses having a negative refractive power in the second lens group G2 in order not to decrease a resolving power of surrounding portion even at a wide angle, e.g., an angle equal to or greater than about 38°. That is, a low dispersion material having an Abbe number equal to or greater than 60 is used in order to facilitate chromatic aberration control.

In addition, each of the zoom lenses according to the first to fourth embodiments may satisfy the condition:

$$Vd3 \geq 70 \quad (2)$$

where $Vd3$ denotes an Abbe number of a lens included in the third lens group G3.

To satisfy the above condition, the third lens group G3 includes lenses made of a material having an Abbe number equal to or greater than 70. Also, chromatic aberration control is easier in this case. Chromatic aberration may be compensated for by using a material having a small Abbe number. However, in this case, the number of lenses increases.

Each of the zoom lenses according to the first to fourth embodiments has a structure in which only some lenses in the third lens group G3 move to compensate for hand shake. For example, the second sub-lens group S2 may move in a direction orthogonal to the optical axis. When the second sub-lens group S2 moves in the direction perpendicular to the optical axis for hand shake correction, a hand shake correction controller and related mechanism can be simplified compared with the case when the whole third lens group G3 moves, which eventually results in cost reduction.

Each of the zoom lenses according to first to fourth embodiments may satisfy the condition:

$$2.0 \leq f\_S2/fw \leq 4.1 \quad (3)$$

where $f\_S2$ denotes the focal length of the second sub-lens group S2, and $fw$ denotes the focal length at a wide angle position of the overall zoom lens.

According to the above condition, a refractive power of the zoom lens is limited in order to correct hand shake. To maximize a hand shake compensation effect, a proper stroke amount of the movement orthogonal to the optical axis for hand shake correction must be achieved. If the upper limit of the above condition is not satisfied, the stroke amount for hand shake correction is large, causing the hand shake compensation effect to be insignificant, and if the lower limit of the above condition is not satisfied, the hand shake compensation effect can be large, but aberration control is not easy, thereby making it difficult to obtain a large aperture.

In addition, each of the zoom lenses according to the first to fourth embodiments may satisfy the condition:

$$4 \leq f4/fw \leq 8.5 \quad (4)$$

where f4 denotes the focal length of the fourth lens group G4, and fw denotes the focal length at the wide angle position of the overall zoom lens.

If the lower limit of the above condition is not satisfied, a refractive power of the fourth lens group G4 is too large, thereby making a change in an aberration large when an image field is corrected according to an object distance. If the upper limit of the above condition is not satisfied, the distance by which the fourth lens group G4 must move along the optical axis increases.

In addition, each of the zoom lenses according to the first to fourth embodiments may satisfy the condition:

$$Pvd - Nvd \geq 10 \qquad (5)$$

where Pvd denotes an Abbe number of a positive lens included in the first lens group G1, and Nvd denotes an Abbe number of a negative lens included in the first lens group G1. The above condition is to control color aberration, wherein, if a difference between the Abbe number of the positive lens and the Abbe number of the negative lens is less than the lower limit, it is difficult to control chromatic aberration.

In addition, each of the zoom lenses according to the first to fourth embodiments may satisfy the condition $$Nd1 \geq 1.9 \qquad (6)$$

where Nd1 denotes a refractive index of the positive lens included in the first lens group G1.

To achieve a wide angle, the refractive index of the positive lens included in the first lens group G1 must be large, and therefore, a material having a refractive index of equal to or greater than 1.9 should be used for the positive lens included in the first lens group G1. If a material that does not satisfy this condition is used, distortion aberration may be large, the radius of curvature in the positive lens included in the first lens group G1 is small, and the lens is thick.

A configuration of each of the first to fourth lens groups G1, G2, G3, and G4 will now be described in detail.

The first lens group G1 may include a first lens 110 that is a positive lens and a second lens 120 that is a negative lens. The first lens 110 and the second lens 120 may form a doublet lens. Due to this configuration of the first lens group G1, aberration control may be easy and a process for manufacturing the zoom lens may be simple.

The second lens group G2 may include a third lens 210 that is a negative lens, a fourth lens 220 that is a negative lens, and a fifth lens 230 that is a positive lens. The third lens 210 may have a meniscus shape concave towards the image side (IMG) and may be an aspheric lens. The fourth lens 220 may have a biconcave shape, and the fifth lens 230 may have a meniscus shape convex towards the object side OBJ.

The third lens group G3 includes a first sub-lens group S1 having a positive refractive power and a second sub-lens group S2 having a positive refractive power. The iris ST may be arranged between the first sub-lens group S1 and the second sub-lens group S2. The first sub-lens group S1 includes a sixth lens 310 that is a positive lens, a seventh lens 320 that is a positive lens, and an eighth lens 330 that is a negative lens, wherein the sixth lens 310 may be an aspheric lens, and the seventh and eighth lenses 320 and 330 may form a doublet lens. The second sub-lens group S2 includes a ninth lens 340 and a tenth lens 350. The ninth lens 340 may have a meniscus shape concave towards the object side OBJ.

The fourth lens group G4 may be formed by an eleventh lens 410. The eleventh lens 410 may have a meniscus shape convex towards the object side OBJ and may be an aspheric lens. Due to this shape, it is easy to correct a curvature of the image field, and an aberration change according to an object distance is small during focusing. The eleventh lens 410 may be made of a plastic resin material. The fourth lens group G4 has the smallest sensitivity from among the entire lens groups, and also the cost for making the forth lens group G4 may be reduced by using a plastic lens.

An infrared filter 510 and a cover glass 520 may be arranged on image side IMG of the fourth lens group G4.

Lens data of each of the lens groups G1, G2, G3, and G4 according to the first to fourth embodiments will now be described in detail.

An aspheric surface ASP in the first to fourth embodiments is defined as follows.

$$x = \frac{c'y^2}{1 + \sqrt{1 - (K+1)c'^2 h^2}} + Ah^4 + Bh^6 + Ch^8 + Dh^{10},$$

where x denotes the distance from the vertex of the lens along the optical axis, y denotes a distance from the vertex of the lens along a direction perpendicular to the optical axis, K is a conic constant, A, B, C, and D are aspheric coefficients, and c' denotes a reciprocal (1/R) of the radius of curvature at the vertex of the lens.

Also, ST denotes an iris, ASP denotes an aspheric surface, F denotes a focal length, Fno denotes an F-number, $2\omega$ denotes an angle of view, and D1, D2, D3, D4, and D5 denote variable distances at a wide angle position, a middle position, and a telephoto position, respectively. All units of the focal length, the radius of curvature, thickness, and the distances are "mm", and a unit of the angle of view is °. The sign * immediately after a surface number indicates that the surface is an aspheric surface.

<First Embodiment>

FIG. 1 illustrates an optical arrangement of a zoom lens according to the first embodiment. Lens data of the zoom lens of FIG. 1 is as follows.

f; 5.36~10.5~17.19   Fno; 1.47~2.15~2.62   $2\omega$; 82.7~48.55~30.78

TABLE 1

| Surface | Radius of curvature | Thickness | Refractive index (nd) | Abbe number (vd) |
|---|---|---|---|---|
| 1 | 38.487 | 0.80 | 2.003 | 19.32 |
| 2 | 23.886 | 3.66 | 1.911 | 35.25 |
| 3 | 319.810 | D1 | | |
| 4* | 100.000 | 1.00 | 1.850 | 40.50 |
| 5* | 6.874 | 4.38 | | |
| 6 | −21.597 | 0.60 | 1.593 | 68.62 |
| 7 | 21.597 | 0.10 | | |
| 8 | 16.444 | 1.84 | 2.003 | 19.32 |
| 9 | 71.589 | D2 | | |
| 10* | 12.052 | 2.41 | 1.850 | 40.50 |
| 11* | −78.579 | 0.10 | | |
| 12 | 7.520 | 2.82 | 1.497 | 81.61 |
| 13 | −6116.135 | 0.45 | 1.847 | 23.78 |
| 14 | 6.631 | 2.21 | | |
| ST | infinity | 2.01 | | |
| 16 | −10.280 | 0.50 | 1.847 | 23.78 |
| 17 | −15.841 | 0.10 | | |
| 18 | 14.488 | 1.84 | 1.690 | 52.80 |
| 19* | −16.721 | D3 | | |
| 20* | 10.195 | 2.09 | 1.543 | 56.00 |
| 21* | 17.643 | D4 | | |
| 22 | infinity | 0.30 | 1.517 | 64.20 |
| 23 | infinity | 0.50 | | |
| 24 | infinity | 0.50 | 1.517 | 64.20 |
| 25 | infinity | D5 | | |
| IMG | infinity | | | |

TABLE 2

| Surface | K | A | B | C | D |
|---|---|---|---|---|---|
| 4 | −1.000000 | −7.400501E−05 | 9.181163E−07 | −4.426827E−09 | 0.000000E+00 |
| 5 | −0.458080 | −1.058602E−05 | −2.441963E−07 | 4.686387E−08 | 0.000000E+00 |
| 10 | 0.761836 | −7.513266E−05 | −3.542047E−07 | 0.000000E+00 | 0.000000E+00 |
| 11 | −6.890127 | 5.649658E−05 | −1.064257E−09 | 7.081900E−09 | 0.000000E+00 |
| 19 | −1.007587 | 1.988282E−04 | 0.000000E+00 | 0.000000E+00 | 0.000000E+00 |
| 20 | −1.633994 | 1.637529E−04 | −1.139580E−05 | −9.574323E−08 | −2.065146E−09 |
| 21 | −5.644134 | 3.221499E−04 | −2.230321E−05 | 0.000000E+00 | 0.000000E+00 |

TABLE 3

|  | WIDE | MIDDLE | TELE |
|---|---|---|---|
| D1 | 0.80 | 6.30 | 11.34 |
| D2 | 14.22 | 5.01 | 1.02 |
| D3 | 4.84 | 8.79 | 12.72 |
| D4 | 2.00 | 3.28 | 4.55 |
| D5 | 0.60 | 0.60 | 0.65 |

Figure 2B:
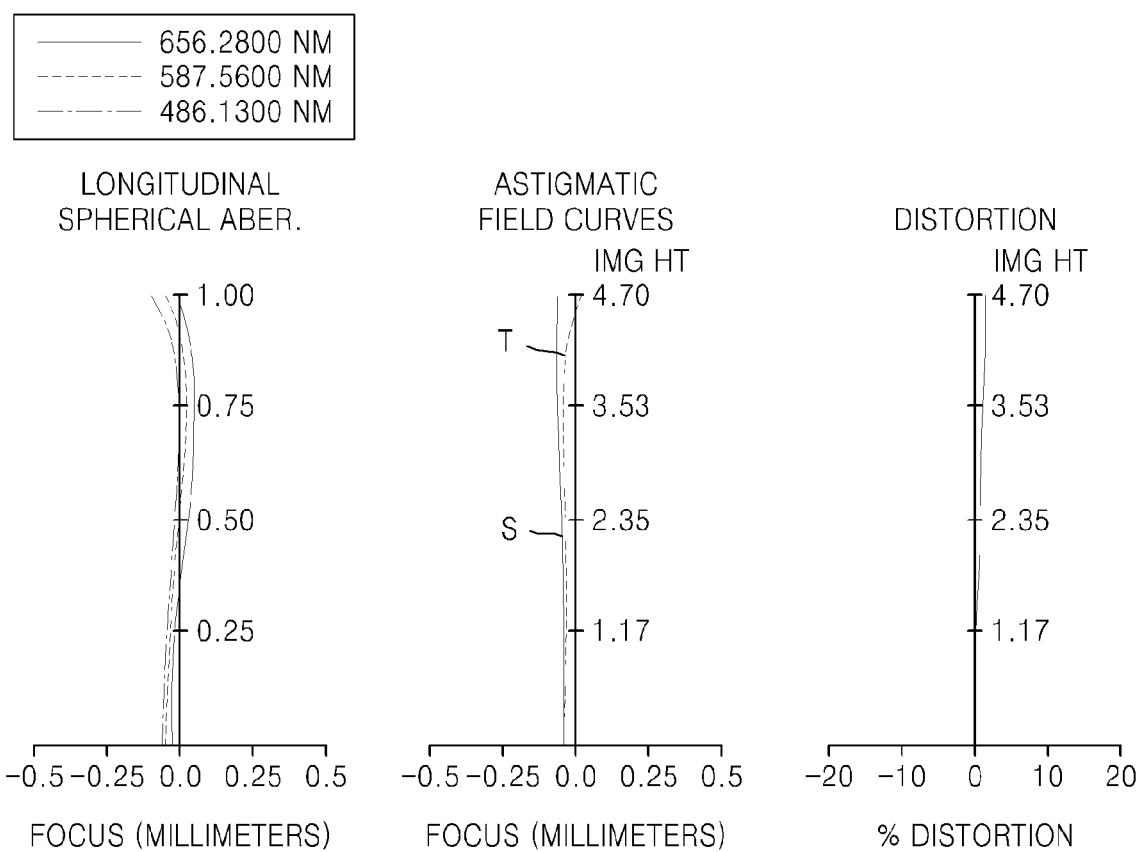

FIGS. 2A and 2B are aberration diagrams respectively showing longitudinal spherical aberrations, astigmatic field curves, and distortions at the wide angle position and the telephoto position of the zoom lens, according to the first embodiment. The spherical aberrations are shown for a C-line having a wavelength of 656.28 nm, a d-line having a wavelength of 587.56 nm, and an F-line having a wavelength of 486.13 nm. In the astigmatic field curves, T and S denote curvatures at a tangential surface and a sagittal surface, respectively.

<Second Embodiment>

Figure 3:
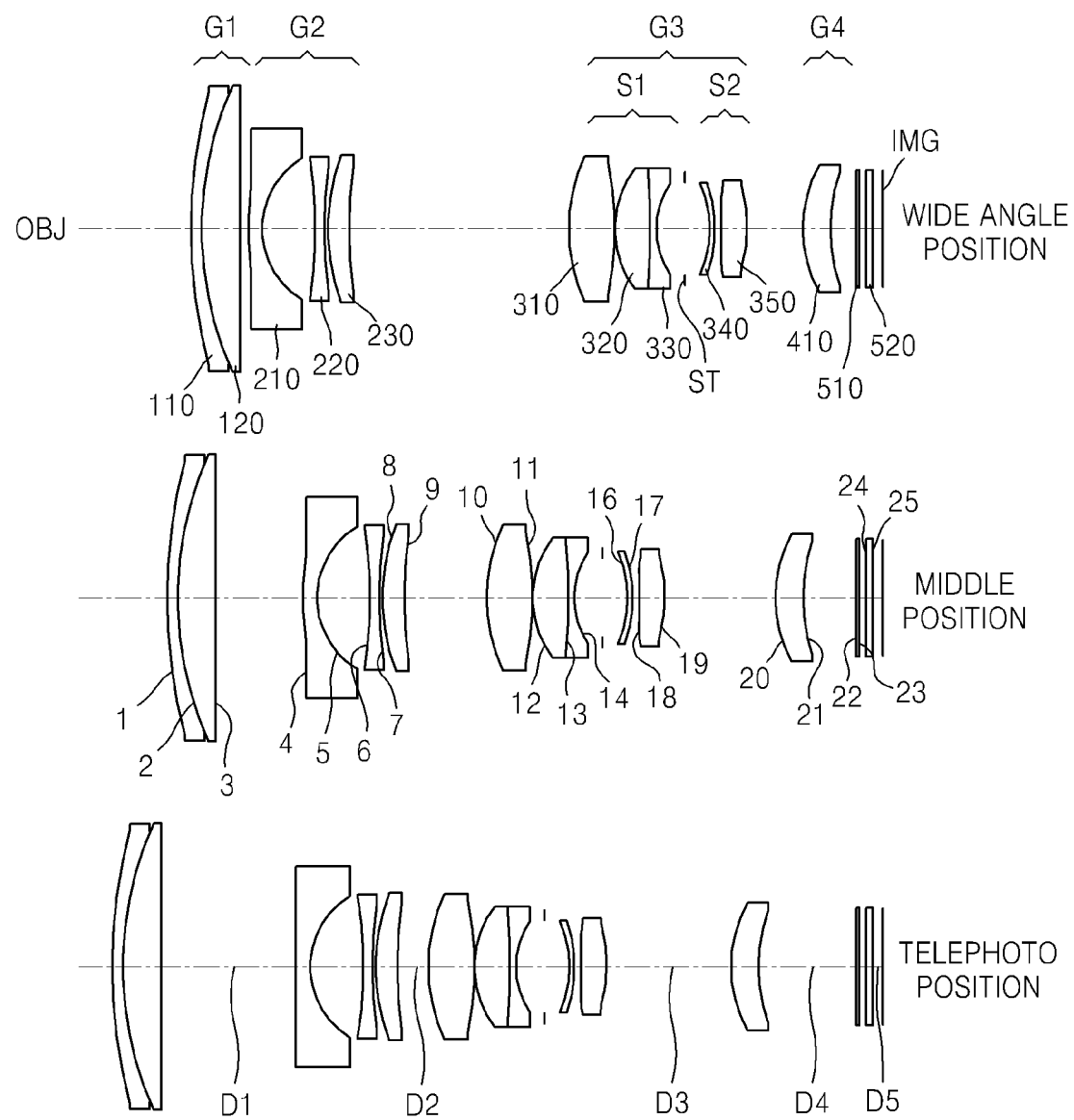
FIG. 3 illustrates an arrangement at a wide angle position, a middle position, and a telephoto position of a zoom lens according to a second embodiment.

FIG. 3 shows an optical arrangement of a zoom lens according to the second embodiment. Lens data of the zoom lens of FIG. 3 is as follows.

f; 4.99~10.30~14.99  Fno; 1.54~2.36~2.79  2ω; 86.66~48.37~34.26

TABLE 4

| Surface | Radius of curvature | Thickness | Refractive index (nd) | Abbe number (vd) |
|---|---|---|---|---|
| 1 | 47.984 | 0.80 | 1.923 | 20.88 |
| 2 | 27.162 | 3.09 | 1.911 | 35.25 |
| 3 | 768.629 | D1 |  |  |
| 4* | 100.000 | 1.00 | 1.850 | 40.50 |
| 5* | 5.741 | 4.32 |  |  |
| 6 | −33.694 | 0.60 | 1.593 | 68.62 |
| 7 | 33.694 | 0.40 |  |  |
| 8 | 16.540 | 1.71 | 2.003 | 19.32 |
| 9 | 50.096 | D2 |  |  |
| 10* | 13.875 | 3.70 | 1.850 | 40.50 |
| 11* | −30.671 | 0.10 |  |  |
| 12 | 7.612 | 2.91 | 1.487 | 70.44 |
| 13 | −39.725 | 0.45 | 1.847 | 23.78 |
| 14 | 6.631 | 2.21 |  |  |
| ST | infinity | 2.01 |  |  |
| 16 | −10.280 | 0.50 | 1.847 | 23.78 |
| 17 | −11.585 | 0.50 |  |  |
| 18 | 60.477 | 2.02 | 1.697 | 55.46 |
| 19 | −15.996 | D3 |  |  |
| 20* | 10.566 | 2.30 | 1.543 | 56.00 |
| 21 | 17.912 | D4 |  |  |
| 22 | infinity | 0.30 | 1.517 | 64.20 |
| 23 | infinity | 0.50 |  |  |
| 24 | infinity | 0.50 | 1.517 | 64.20 |
| 25 | infinity | D5 |  |  |
| IMG | infinity |  |  |  |

TABLE 5

| Surface | K | A | B | C | D |
|---|---|---|---|---|---|
| 4 | −1.000000 | −1.323942E−04 | 1.525045E−06 | −6.357575E−09 | 0.000000E+00 |
| 5 | −0.954845 | 1.802540E−04 | 1.850974E−08 | 1.026338E−07 | 0.000000E+00 |
| 10 | 1.987503 | −8.508955E−05 | −8.875754E−07 | 0.000000E+00 | 0.000000E+00 |
| 11 | −12.989777 | 5.663975E−05 | −6.222322E−07 | 3.769784E−08 | 0.000000E+00 |
| 20 | −11.217468 | 1.049710E−03 | −3.257818E−05 | 7.887941E−07 | −8.368886E−09 |

TABLE 6

|  | WIDE | MIDDLE | TELE |
|---|---|---|---|
| D1 | 0.80 | 7.17 | 10.87 |
| D2 | 17.57 | 6.55 | 2.43 |
| D3 | 4.60 | 8.97 | 10.07 |
| D4 | 2.00 | 4.22 | 7.77 |
| D5 | 0.60 | 0.62 | 0.68 |

Figure 4A:
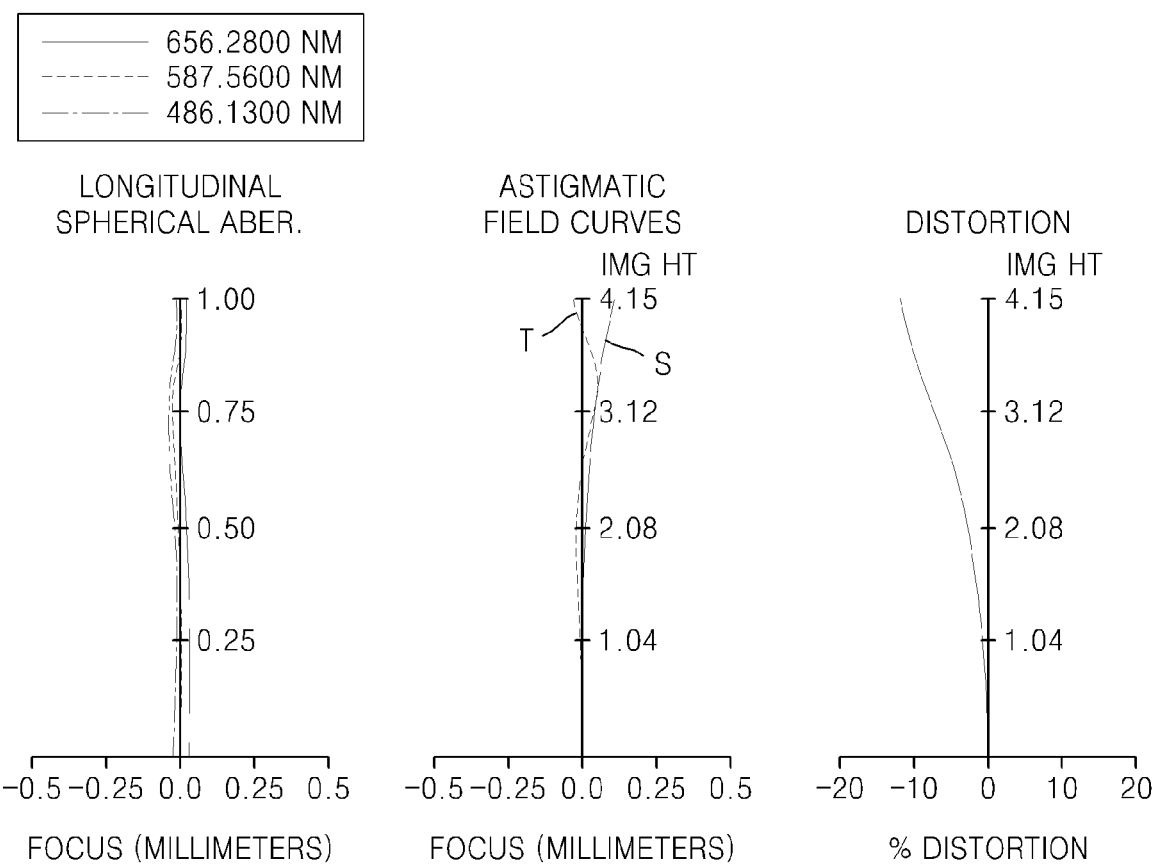
FIGS. 4A and 4B illustrate longitudinal spherical aberrations, astigmatic field curves, and distortions at the wide angle position and the telephoto position of the zoom lens according to the embodiment illustrated in FIG. 3.
Figure 4B:
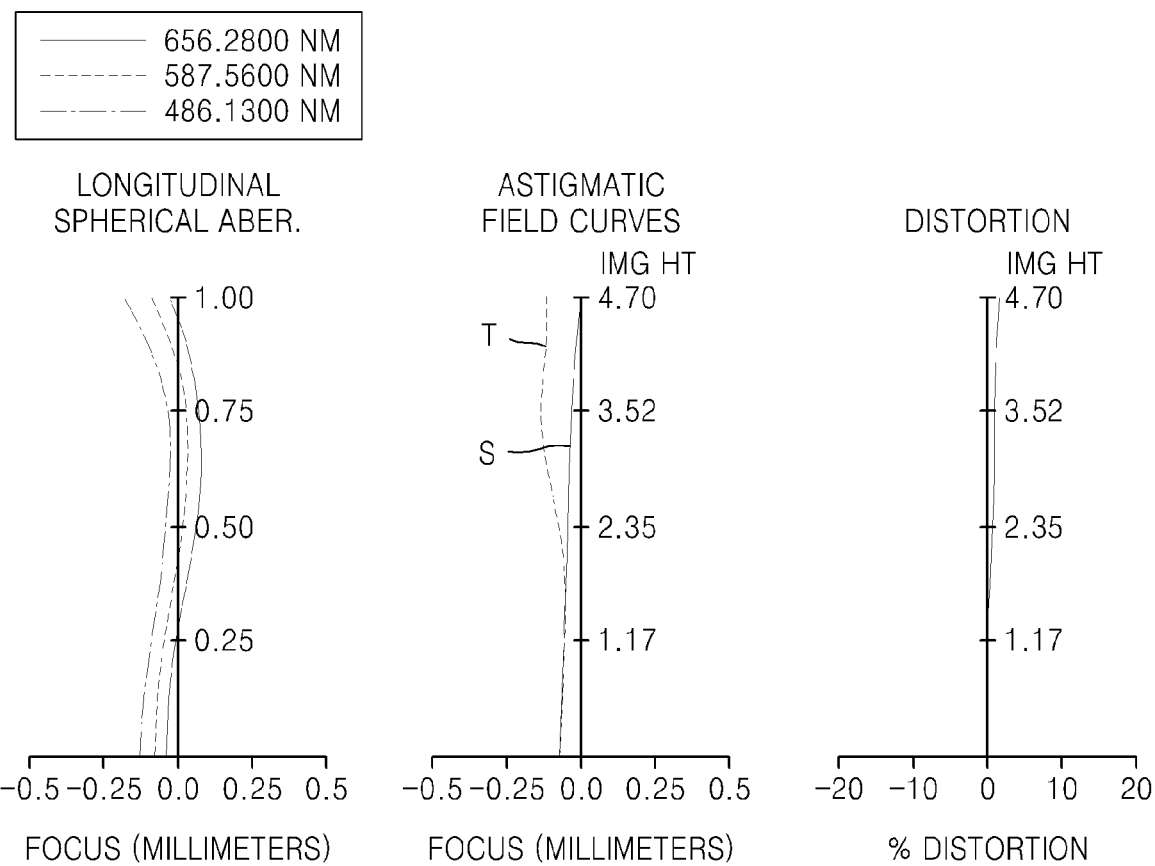

FIGS. 4A and 4B are aberration diagrams showing longitudinal spherical aberrations, astigmatic field curves, and distortions at the wide angle position and the telephoto position of the zoom lens according to the second embodiment.

<Third Embodiment>

FIG. 5 shows an optical arrangement of a zoom lens according to the third embodiment. Lens data of the zoom lens of FIG. 5 is as follows.

f; 5.36~10.30~15.55  Fno; 1.56~2.17~2.57  2ω; 82.746~49.26~33.14

TABLE 7

| Surface | Radius of curvature | Thickness | Refractive index (nd) | Abbe number (vd) |
|---|---|---|---|---|
| 1 | 35.131 | 0.80 | 2.003 | 19.32 |
| 2 | 21.916 | 3.44 | 1.904 | 31.32 |
| 3 | 158.563 | D1 |  |  |
| 4* | 100.000 | 1.00 | 1.850 | 40.50 |
| 5* | 6.612 | 4.31 |  |  |
| 6 | −22.014 | 0.60 | 1.497 | 81.61 |

TABLE 7-continued

| Surface | Radius of curvature | Thickness | Refractive index (nd) | Abbe number (vd) |
|---|---|---|---|---|
| 7 | 20.200 | 0.10 | | |
| 8 | 14.546 | 1.72 | 2.003 | 19.32 |
| 9 | 36.135 | D2 | | |
| 10* | 11.357 | 2.52 | 1.850 | 40.50 |
| 11* | −43.779 | 0.21 | | |
| 12 | 12.048 | 4.00 | 1.497 | 81.61 |
| 13 | −12.209 | 0.45 | 1.847 | 23.78 |
| 14 | 6.631 | 1.91 | | |
| ST | infinity | 1.50 | | |
| 16 | −103.606 | 0.50 | 1.847 | 23.78 |
| 17 | −101.942 | 0.10 | | |
| 18* | 19.933 | 2.24 | 1.690 | 52.80 |
| 19* | −11.363 | D3 | | |
| 20* | 13.837 | 1.47 | 1.543 | 56.00 |
| 21* | 35.888 | D4 | | |
| 22 | infinity | 0.30 | 1.517 | 64.20 |
| 23 | infinity | 0.50 | | |
| 24 | infinity | 0.50 | 1.517 | 64.20 |
| 25 | infinity | D5 | | |
| IMG | infinity | | | |

TABLE 8

| Surface | K | A | B | C | D |
|---|---|---|---|---|---|
| 4 | −1.000000 | −6.733028E−05 | 9.946818E−07 | −4.885706E−09 | 0.000000E+00 |
| 5 | −0.402150 | −1.730651E−05 | −1.408715E−06 | 7.930965E−08 | 0.000000E+00 |
| 10 | 0.436693 | −1.012929E−04 | −9.451529E−07 | 0.000000E+00 | 0.000000E+00 |
| 11 | −7.682422 | 3.390214E−05 | −6.539189E−07 | 9.346679E−09 | 0.000000E+00 |
| 18 | −10.000000 | 2.077017E−05 | 0.000000E+00 | 0.000000E+00 | 0.000000E+00 |
| 19 | −3.145960 | −3.494301E−04 | 0.000000E+00 | 0.000000E+00 | 0.000000E+00 |
| 20 | −0.120991 | 2.334610E−04 | −1.203872E−05 | 1.419747E−07 | −1.420108E−09 |
| 21 | 41.854196 | 3.758588E−04 | −2.753412E−05 | 7.737273E−07 | −1.544903E−08 |

TABLE 9

| | WIDE | MIDDLE | TELE |
|---|---|---|---|
| D1 | 0.80 | 6.40 | 10.50 |
| D2 | 13.62 | 4.86 | 0.80 |
| D3 | 4.99 | 10.47 | 13.20 |
| D4 | 3.04 | 3.10 | 5.25 |
| D5 | 0.58 | 0.60 | 0.65 |

Figure 6A:
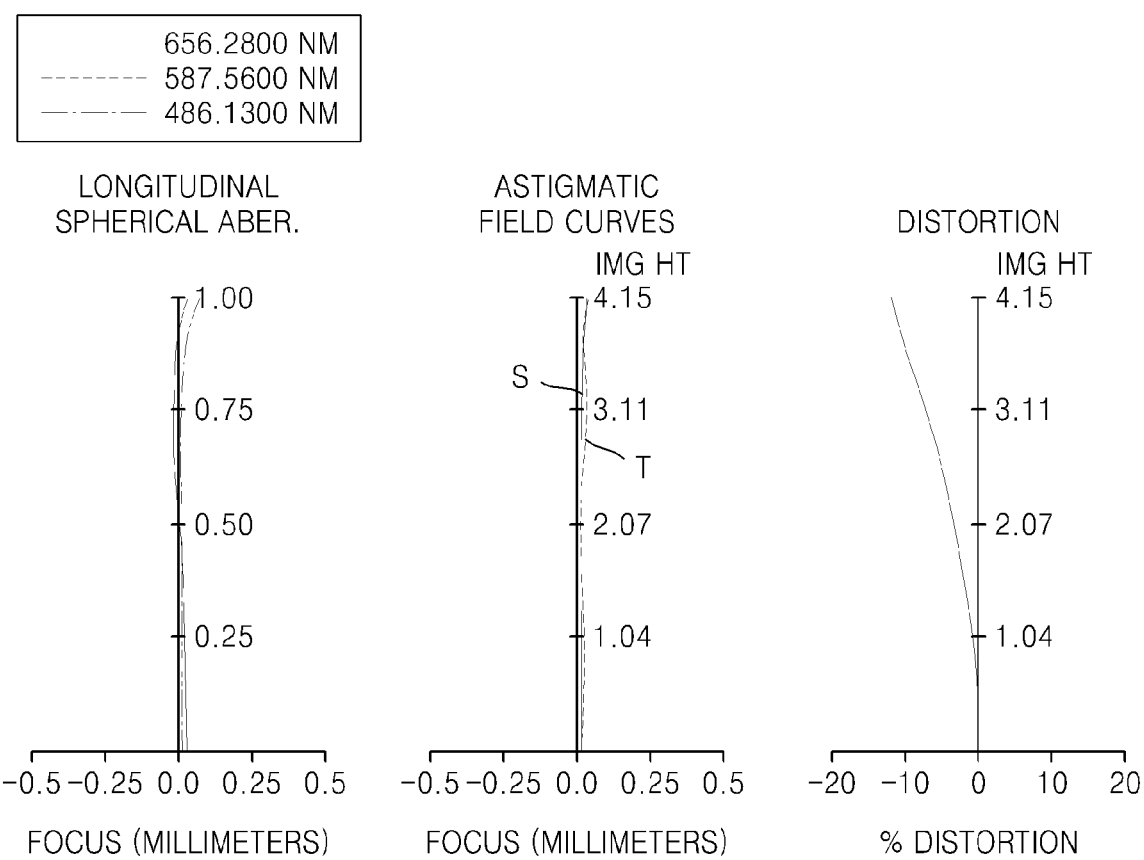
FIGS. 6A and 6B illustrate longitudinal spherical aberrations, astigmatic field curves, and distortions at the wide angle position and the telephoto position of the zoom lens according to the embodiment illustrated in FIG. 5.
Figure 6B:
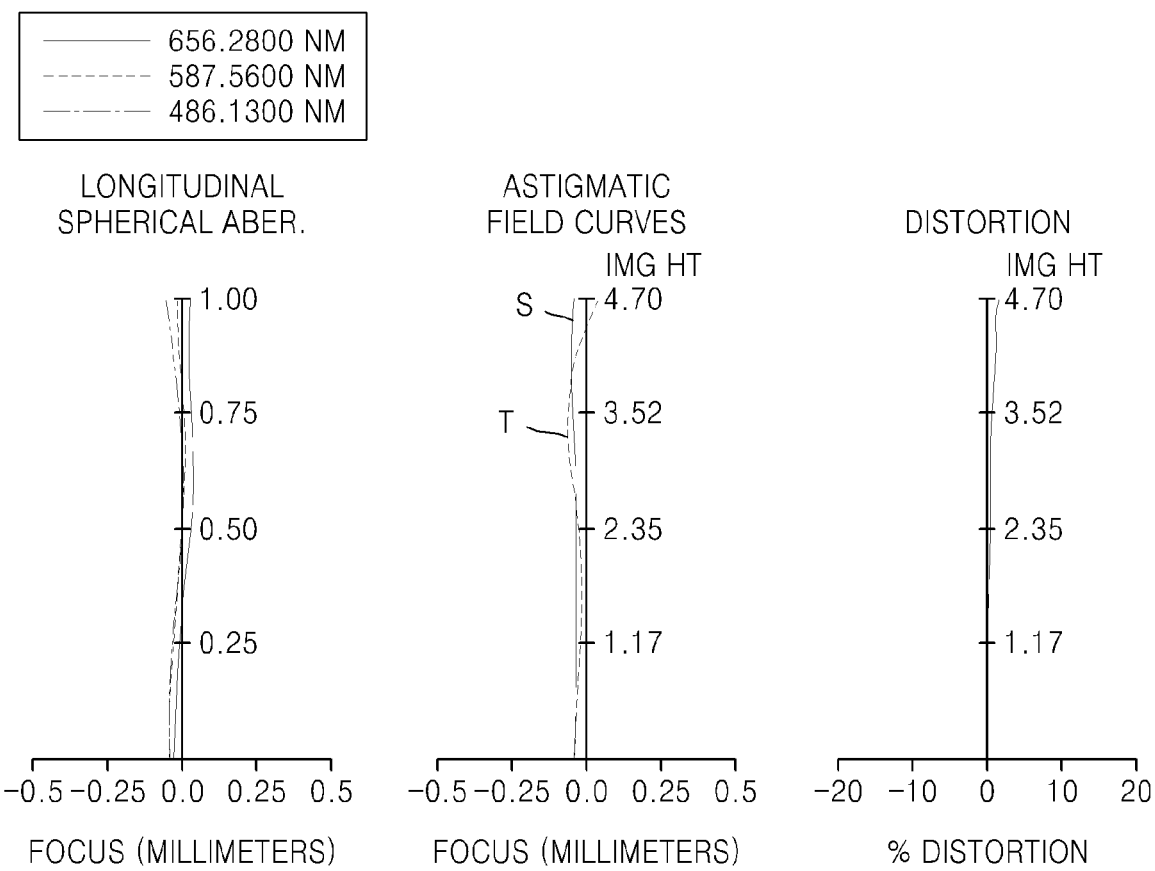

FIGS. 6A and 6B are aberration diagrams showing longitudinal spherical aberrations, astigmatic field curves, and distortions at the wide angle position and the telephoto position of the zoom lens according to the third embodiment.

<Fourth Embodiment>

Figure 7:
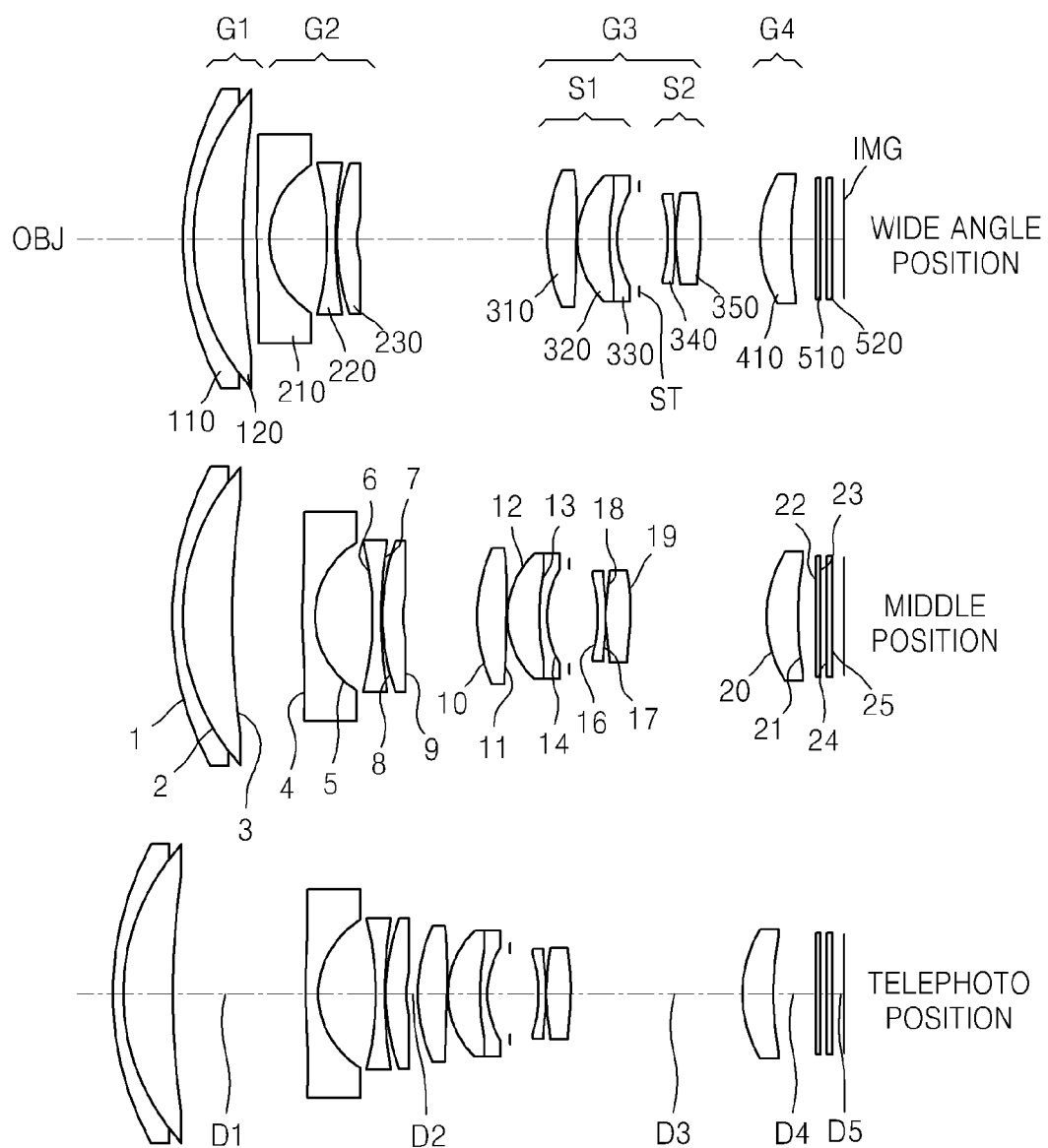
FIG. 7 illustrates an arrangement at a wide angle position, a middle position, and a telephoto position of a zoom lens according to a fourth embodiment.

FIG. 7 shows an optical arrangement of a zoom lens according to the fourth embodiment. Lens data of the zoom lens of FIG. 7 is as follows.

f; 5.36~10.51~17.10  Fno; 1.441~2.17~2.45  2ω; 79.11~47.42~30.283

TABLE 10

| Surface | Radius of curvature | Thickness | Refractive index (nd) | Abbe number (vd) |
|---|---|---|---|---|
| 1 | 24.996 | 0.80 | 1.946 | 17.98 |
| 2 | 17.515 | 3.88 | 1.883 | 40.81 |
| 3 | 71.697 | D1 | | |
| 4* | 100.000 | 1.00 | 1.850 | 40.50 |
| 5* | 5.516 | 4.54 | | |
| 6 | −21.000 | 0.60 | 1.437 | 95.10 |
| 7 | 32.589 | 0.10 | | |
| 8 | 17.519 | 1.79 | 2.003 | 19.32 |
| 9 | 97.872 | D2 | | |
| 10* | 12.273 | 2.29 | 1.850 | 40.50 |
| 11* | −106.442 | 0.10 | | |
| 12 | 6.774 | 2.65 | 1.437 | 95.10 |
| 13 | 38.754 | 0.45 | 1.847 | 23.78 |
| 14 | 6.860 | 1.76 | | |
| stop | infinity | 2.34 | | |
| 16 | −11.822 | 0.50 | 1.847 | 23.78 |
| 17 | −90.000 | 0.10 | | |
| 18* | 12.470 | 2.00 | 1.690 | 52.80 |
| 19* | −13.986 | D3 | | |
| 20* | 10.781 | 2.50 | 1.543 | 56.00 |
| 21* | 123.916 | D4 | | |

TABLE 10-continued

| Surface | Radius of curvature | Thickness | Refractive index (nd) | Abbe number (vd) |
|---|---|---|---|---|
| 22 | infinity | 0.30 | 1.517 | 64.20 |
| 23 | infinity | 0.50 | | |
| 24 | infinity | 0.50 | 1.517 | 64.20 |
| 25 | infinity | D5 | | |
| IMG | infinity | | | |

TABLE 11

| Surface | K | A | B | C | D |
|---|---|---|---|---|---|
| 4 | −1.000000 | −1.274482E−04 | 1.487297E−06 | −6.581816E−09 | 0.000000E+00 |
| 5 | −0.851054 | 4.882444E−05 | −1.533280E−06 | 6.000471E−08 | 0.000000E+00 |
| 10 | 1.150879 | −1.090996E−04 | 2.897069E−08 | 0.000000E+00 | 0.000000E+00 |
| 11 | 9.841687 | 2.591487E−05 | 1.026153E−06 | 7.571405E−09 | 0.000000E+00 |
| 18 | −0.973838 | −1.193225E−04 | 0.000000E+00 | 0.000000E+00 | 0.000000E+00 |
| 19 | −0.965998 | 2.962936E−04 | 0.000000E+00 | 0.000000E+00 | 0.000000E+00 |
| 20 | −3.668189 | 5.619275E−04 | 1.053851E−06 | −1.046949E−07 | 6.007737E−09 |
| 21 | 50.000000 | 5.266573E−04 | −7.631143E−06 | 1.701526E−07 | 3.556697E−09 |

TABLE 12

| | WIDE | MIDDLE | TELE |
|---|---|---|---|
| D1 | 1.11 | 5.20 | 10.50 |
| D2 | 14.76 | 5.74 | 0.80 |

TABLE 12-continued

|    | WIDE | MIDDLE | TELE |
|----|------|--------|------|
| D3 | 4.60 | 10.66  | 13.20 |
| D4 | 2.00 | 1.56   | 3.49 |
| D5 | 0.60 | 0.62   | 0.63 |

Figure 8A:
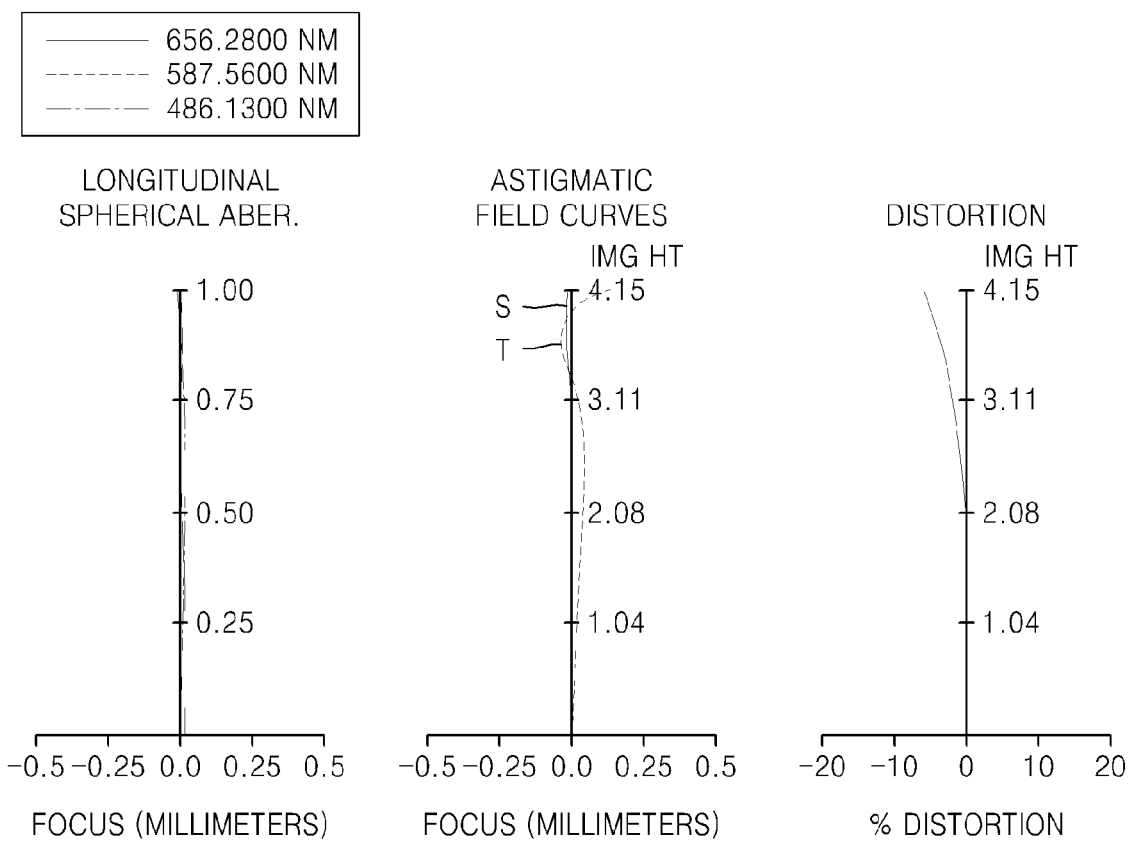
FIGS. 8A and 8B illustrate longitudinal spherical aberrations, astigmatic field curves, and distortions at the wide angle position and the telephoto position of the zoom lens according to the embodiment illustrated in FIG. 7.
Figure 8B:
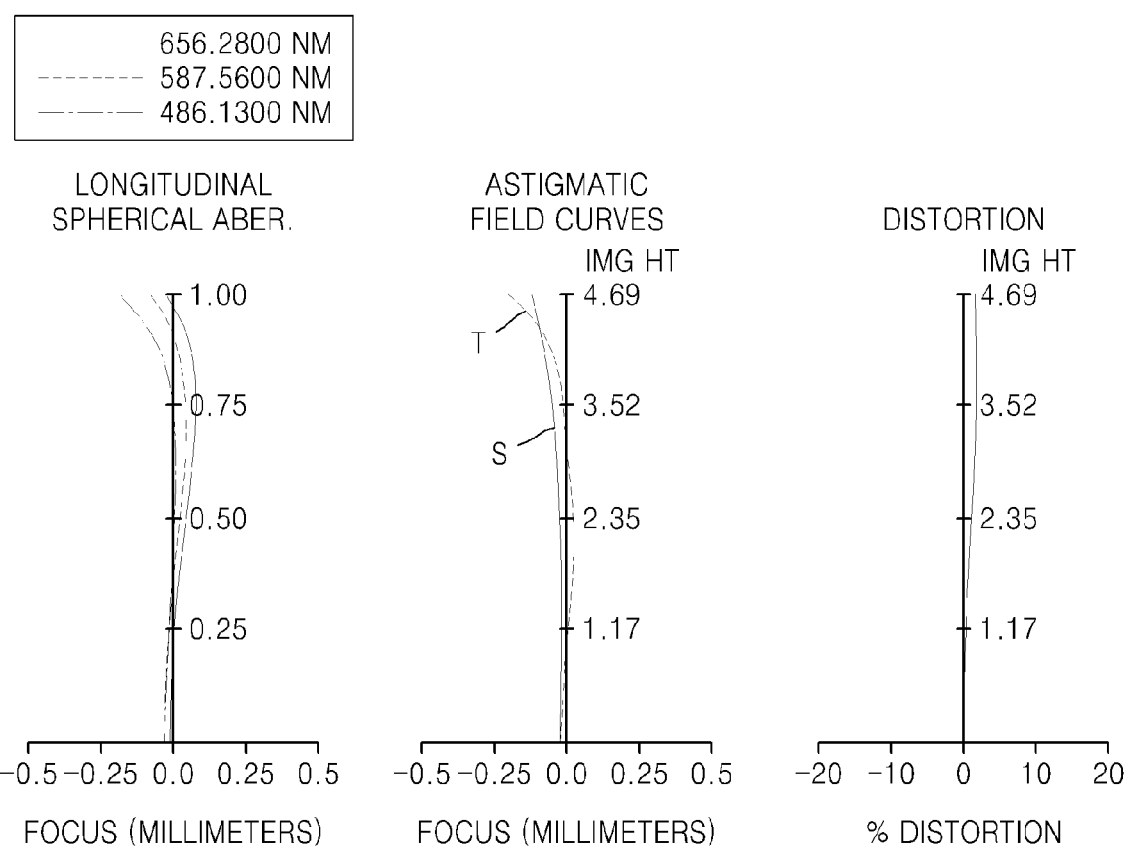

FIGS. 8A and 8B are aberration diagrams respectively showing longitudinal spherical aberrations, astigmatic field curves, and distortions at the wide angle position and the telephoto position of the zoom lens according to the fourth embodiment.

The table below shows that the first to fourth embodiments satisfy the conditions described above.

TABLE 13

|   | Condition | First embodiment | Second embodiment | Third embodiment | Fourth embodiment |
|---|-----------|------------------|-------------------|------------------|-------------------|
| (1) | Vd2     | 68.620 | 68.620 | 81.610 | 95.100 |
| (2) | Vd3     | 81.608 | 70.440 | 81.610 | 95.100 |
| (3) | f_S2/fw | 2.981  | 4.100  | 2.000  | 4.100  |
| (4) | f4/fw   | 7.511  | 8.500  | 7.510  | 4.000  |
| (5) | Pvd − Nvd | 15.933 | 14.370 | 11.998 | 22.821 |
| (6) | Nd1     | 2.003  | 1.923  | 2.003  | 1.946  |

According to the disclosed embodiments, a wide-angle and bright zoom lens is provided. The zoom lens may be employed in various types of imaging apparatuses together with an image pickup device for converting an optical image formed through the zoom lens into an electrical signal.

While various embodiments have been described with reference to the accompanying drawings, it will be understood by those of ordinary skill in the art that various changes in form and details may be made therein without departing from the spirit and scope of the invention as defined by the following claims.

What is claimed is:

1. A zoom lens comprising:
a first lens group having a positive refractive power;
a second lens group having a negative refractive power;
a third lens group including a first sub-lens group having a positive refractive power, an iris, and a second sub-lens group having a positive refractive power; and
a fourth lens group having a positive refractive power,
wherein the first to fourth lens groups are sequentially arranged from an object side to an image side,
the distance between each of the first to fourth lens groups changes when zooming from a wide angle position to a telephoto position, the surface of the lens closest to the image side in the first sub-lens group is concave, the lens closest to the object side in the second sub-lens group is a meniscus lens concave towards the object side, and the lens closest to the object side in the third lens group is an aspheric lens,
wherein the zoom lens satisfies the conditions:

$Vd2 \geq 60$ $Vd3 \geq 70$, where Vd 2 denotes an Abbe number of a negative lens included in the second lens group, and Vd 3 denotes an Abbe number of a lens included in the third lens group.

2. The zoom lens of claim 1, wherein the second lens group is configured to move for hand shake correction.

3. The zoom lens of claim 2, wherein the zoom lens satisfies the condition:

$2.0 \leq f\_S2/fw \leq 4.1$, where f_S2 denote the focal length of the second sub-lens group, and fw denotes the focal length at a wide angle position of the overall zoom lens.

4. The zoom lens of claim 1, wherein the zoom lens satisfies the condition:

$4 \leq f4/fw \leq 8.5$, where f4 denotes the focal length of the fourth lens group, and fw denotes the focal length at a wide angle position of the overall zoom lens.

5. The zoom lens of claim 1, wherein the fourth lens group includes a lens made of a plastic resin material.

6. The zoom lens of claim 1, wherein the first lens group includes a positive lens and a negative lens.

7. The zoom lens of claim 6, wherein the zoom lens satisfies the condition:

$Pvd-Nvd \geq 10$, where Pvd denotes an Abbe number of the positive lens included in the first lens group, and Nvd denotes an Abbe number of the negative lens included in the first lens group.

8. The zoom lens of claim 6, wherein the first lens group includes a doublet lens containing the positive lens and the negative lens that are combined with each other.

9. The zoom lens of claim 1, wherein the zoom lens satisfies the condition:

$Nd1 \geq 1.9$, where Nd1 denotes a refractive index of the lenses included in the first lens group.

10. The zoom lens of claim 1, wherein the second lens group includes an aspheric lens having a negative refractive power.

11. The zoom lens of claim 1, wherein the third lens group includes an aspheric lens having a positive refractive power.

12. The zoom lens of claim 1, wherein the fourth lens group includes an aspheric lens having a positive refractive power.

13. The zoom lens of claim 1, wherein the fourth lens group includes a meniscus-shaped lens convex towards an object side.

14. An imaging apparatus comprising:
the zoom lens of claim 1; and
an image pickup device for converting an optical image formed by the zoom lens into an electrical signal.

* * * * *